United States Patent [19]

Holmes

[11] 4,423,893
[45] Jan. 3, 1984

[54] SELF-SEALING TAPERED THREAD FORM

[76] Inventor: Horace D. Holmes, 28576 Green Willow, Farmington Hills, Mich. 48024

[21] Appl. No.: 235,391

[22] Filed: Feb. 18, 1981

[51] Int. Cl.³ .................. F16L 25/00; F16L 15/00; F16L 21/00

[52] U.S. Cl. .................................. 285/334; 285/390; 285/417

[58] Field of Search ............... 285/333, 334, 355, 390, 285/403, 417

[56] References Cited

U.S. PATENT DOCUMENTS

| | | | |
|---|---|---|---|
| 1,927,656 | 9/1933 | Eaton et al. | 285/334 X |
| 1,932,427 | 10/1933 | Stone | 285/334 |
| 2,183,644 | 12/1939 | Frame | 285/333 |
| 2,204,754 | 6/1940 | Frame | 285/334 |
| 3,994,516 | 11/1976 | Fredd | 285/333 X |

Primary Examiner—Richard J. Scanlan, Jr.
Attorney, Agent, or Firm—Krass, Young & Schivley

[57] ABSTRACT

A tapered tap suitable for producing tapered pipe threads includes a body provided with a helical thread form having a tapered cross-sectional shape. The thread form is defined by a pair of converging flanks which form a thread crest and thread root respectively lying along inner and outer converging axes. In one embodiment, a portion of the thread crest is radially offset from the outer axis and generates a tapped female thread in which a portion of the tapped thread root is of reduced diameter; the thread root of reduced diameter firmly engages and deforms the crest of a standard male tapered thread to assure that at least a portion of the helical tunnel between the male and female threads is completely sealed to prevent fluid leaks therethrough. In another embodiment, a portion of the thread root of the tap is also radially offset from the inner axis to generate a tapped thread crest of reduced diameter which deforms upon engagement with a standard male tapered thread, thereby improving the seal.

6 Claims, 7 Drawing Figures

SELF-SEALING TAPERED THREAD FORM

TECHNICAL FIELD

This invention generally relates to threaded fasteners, and deals more particularly with a thread tap, and thread form produced thereby, having a tapered cross-sectional shape.

BACKGROUND ART

Standard male and female pipe threads fit together in such a way that the sides or flanks of the threads come in contact but the crests and roots ordinarily do not. This results in a spiral opening or tunnel within the threads throughout the entire length of the thread form. Since it is necessary that pipe fittings be fluid tight, a wet sealer is sometimes applied to the threads before assembly of the fittings in order to fill the spiral tunnel and thereby prevent fluid leaks.

In those applications where the fluid is particularly corrosive or is delivered through the pipe at high pressure, the sealer material may be dissolved or separated within the tunnel by the fluid, thus resulting in a leak.

One previous solution to the problem mentioned above involves truncating the roots of both the male and female thread forms. Upon initial threading of the male and female members, the roots and crests thereof initially contact each other along the entire length of the thread form simultaneously. Further tightening of the threads is intended to cause the crest to deform in order to fill the spiral tunnel with metal in an attempt to create a fluid-tight seal. However, since the roots and crests simultaneously contact each other throughout the entire length of the thread, it becomes quite difficult to apply sufficient torque in order to assure that the entire length of the crest is sufficiently deformed to create the seal. The problem is exacerbated if any of the threads are concave or convex at the pitch diameter. As a result, the prior art thread form seal is often intermittent and/or incomplete.

Accordingly, there is a clear need in the art for a tapered thread form which produces a fluid tight seal in a threaded coupling, even wherein the root or crest of the thread possess concave or convex imperfections therein.

DISCLOSURE OF THE INVENTION

According to the present invention, a tap for forming a tapered female thread includes an elongate body having a helical thread formed thereon which presents a generally tapered cross-sectional shape. The thread form is defined by a pair of converging flanks forming a thread root and thread crest. A first portion of the thread crest lies substantially along a first reference axis which is inclined with respect to the longitudinal axis of the body. A second portion of the thread crest is radially spaced from the first reference axis toward the longitudinal axis of the body. A first portion of the thread root lies substantially along a second reference axis which is inclined with respect to the longitudinal axis of the body and converges toward the first reference axis. Optionally, a second portion of the thread root is radially spaced from the second reference axis. The tap produces a thread form having one or more revolutions of thread crest and thread root which are first to contact the threads of the standard, tapered male thread. Accordingly, essentially the entire torque applied to the threads during tightening is directed through the radially offset portions of the male thread form in order to substantially deform the thread crests at the offset area thus assuring that at least a substantial length of the spiral tunnel between the threads is completely filled to prevent leaks.

BRIEF DESCRIPTION OF THE DRAWINGS

In the drawings, which form an integral part of the specification and are to be read in conjunction therewith, and in which like components are designated by identical reference numerals in the various views.

BEST MODE FOR CARRYING OUT THE INVENTION

Figure 4:
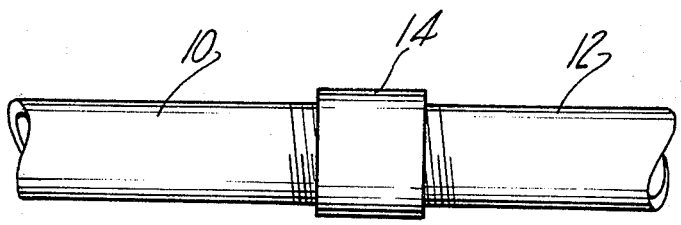
FIG. 4 is an elevational view of a pair of threaded pipes connected by a threaded coupling having a thread form produced by the tap shown in FIG. 1.

Referring first to FIG. 4, the present invention is generally concerned with thread forms of the tapered variety which are particularly suited for threadably connecting one or more pipes 10 and 12 with a threaded pipe fitting, such as the female coupling member 14. The assembly comprising pipes 10 and 12 and coupling 14 provides a continuous, hollow conduit through which fluid may flow, and therefore must be fluid tight at the threaded interface between pipes 10 and 12 and coupling 14.

Figure 1:
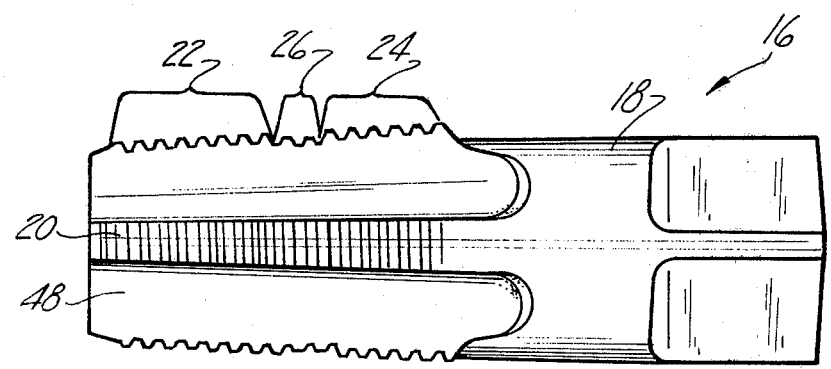
FIG. 1 is an elevational view of a tapping tool provided with a tapered thread form which forms the preferred embodiment of the present invention.
Figure 2:
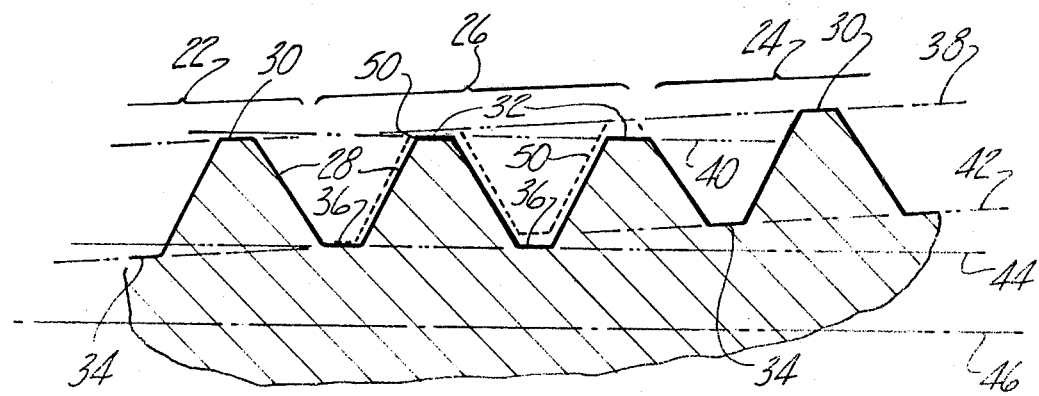
FIG. 2 is an enlarged, fragmentary cross sectional view of portions of the thread form of the tap of FIG. 1.

Referring now to FIGS. 1 and 2, a tapping tool, generally indicated at 16, is provided for producing a self-sealing thread form in a female fastener, such as coupling 14. Tapping tool 16 comprises an elongate body 18 having a thread form 20 defined on one extremity thereof. Thread form 20 is of a generally tapered cross section wherein the major and minor diameter of the thread form is generally greater in magnitude at the medial portion of the tool than at the threaded entry end thereof. The thread form 20 is interrupted by a plurality of circumferentially spaced, longitudinally extending grooves 48 in body 18 which function to permit the escape of chips from the member being tapped and also permit lubrication of the material being tapped immediately ahead of the cutting teeth.

The thread form 20 is defined by a first portion 22 adjacent the inner end of the tool 16, a second portion 24 spaced from the first portion 22 and a third portion 26 between the first portion 22 and second portion 24. The enitre length of the thread form 20 is defined by opposing flanks 28 which are disposed at a constant angle throughout the entire length of the thread form 20, relative to the longitudinal axis 46 of the body 18.

Flanks 28 converge to define truncated crests 30 and roots 34 along the first and second portions 22 and 24 of the thread form 20, and further define truncated crests 32 and roots 36 along the third portion 26 of the thread form 20. Each of the crests 30 are aligned along a reference axis 38 which is inclined with respect to longitudinal axis 46. Similarly, roots 34 are aligned along a reference axis 42 which extends parallel to axis 38 and is inclined with respect to longitudinal axis 46. The crests 32 and roots 36, however, of the third portion 26 respectively lie along reference axes 40 and 44 which are spaced radially inwardly, toward the longitudinal axis 46, and extend substantially parallel to axis 46. Thus, it may be appreciated that the major and minor thread diameters along the third portion 26 of the thread form 20 are less in magnitude than those of a thread form having a constant, uninterrupted taper. For comparative purposes, that portion of an ordinary tapered thread extending through the third portion 26 has been indicated in phantom and designated by the numeral 50.

Preferably, the novel thread form portion 26 extends around at least two revolutions of the body 18 so as to generate at least two corresponding revolutions of female thread in the coupling 14.

Figure 3:
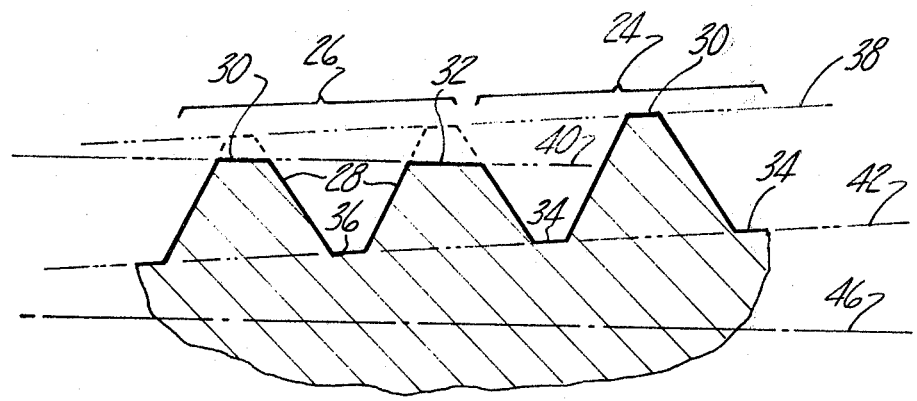
FIG. 3 is a view similar to FIG. 2, but showing an alternate form of the tapered thread of the present invention.

Attention is now directed to FIG. 3 wherein a tapping tool, similar to that previously described, is depicted having an alternate form of the self-sealing tapered thread form of the present invention. The alternate embodiment of the thread form, as shown in FIG. 3, is similar to that shown in FIGS. 1 and 2, except for the fact that the roots 34 and 36 of the second and third thread portions 24 and 26 lie along essentially the same reference axis 42. Axis 42 is inclined with respect to the longitudinal axis 46 while axis 40, along which the crests 32 lie, extends substantially parallel to axis 46. It has been found that the thread form shown in FIG. 3 produces an effective seal between the male and female pipes and allows the use of a tapping tool which is extremely simple to manufacture. For example, the thread form depicted in FIG. 3 may be produced simply by grinding off several revolutions of the crest 30 of a standard tapping tool having a tapered thread form.

Figure 6:
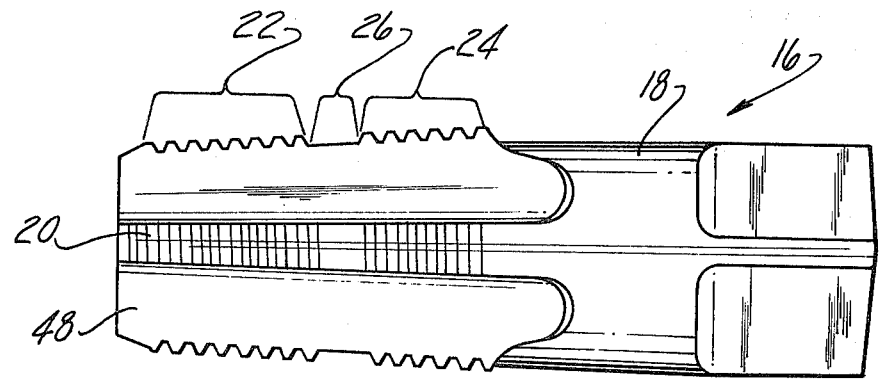
FIG. 6 is an elevational view of a tapping tool provided with a tapered thread form which forms an alternate embodiment of the present invention; and, FIG. 7 is an enlarged, fragmentary cross sectional view of portions of the thread form of the tap shown in FIG. 6.
Figure 7:
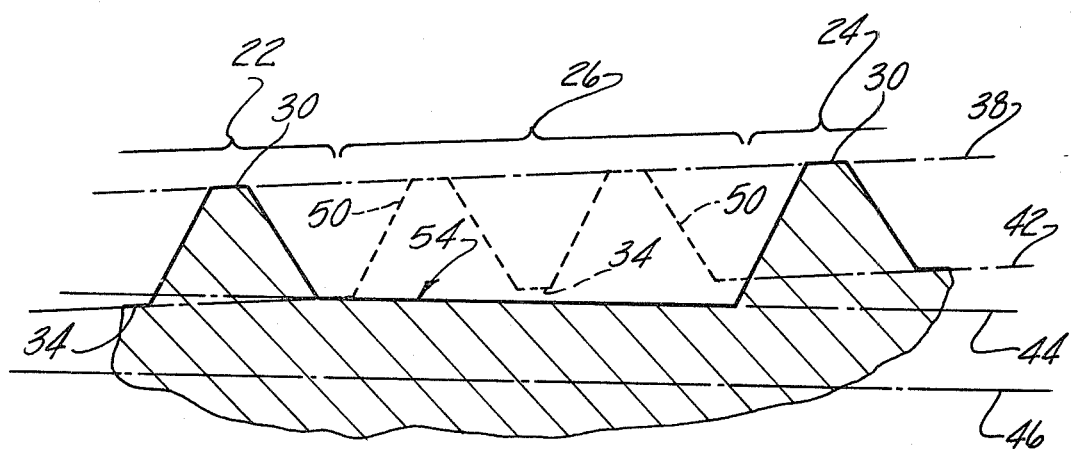

Referring now to FIGS. 6 and 7 wherein still another alternate form of the self-sealing, tapered thread form is depicted, the third thread portion 26 may consist of a ring-shaped cutout defined by essentially flat surface 54 lying along reference axis 44, parallel to the longitudinal axis 46. Surface 54 extends circumferentially around at least one revolution of the tapered thread form, and extends longitudinally a distance at least as great as the distance between adjacent portions of the root 34 measured along reference axis 42. Preferably, however, surface 54 extends circumferentially around at least two revolutions of the thread form. A substantial portion of the surface 54 possesses a diameter which is less than the minor diameter of the thread form (i.e., the diameter of the root 36) along the third thread portion 26. It may thus be appreciated that the third thread portion 26 depicted in FIGS. 6 and 7 is characterized by total absence of at least one revolution of the thread form. The cutout mentioned above may be simply effected by simply grinding down the crests of the thread form until the flat surface 54 is achieved.

INDUSTRIAL APPLICABILITY

Although the self-sealing, tapered thread form is described above with reference to pipes, the thread form of the present invention is well adapted for use in many other applications where it is desirable to produce a reliable, fluid tight seal between the tapered threads of a male and female member. It is to be further noted that the novel thread form of the present invention is defined only in the female thread of the coupling, and is therefore intended to be used with any standard male thread having a conventionally tapered cross section.

Figure 5:
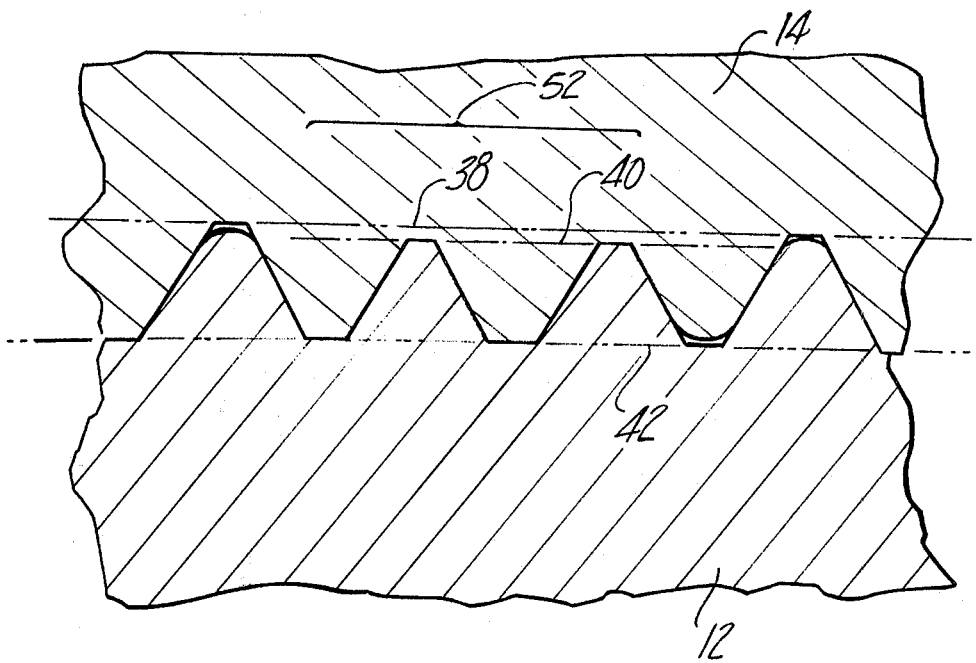
FIG. 5 is a cross sectional view of the thread interface between one of the pipes and the coupling shown in FIG. 4.

The tapping tool previously described produces a thread form having one or more revolutions of a thread root, and optionally a thread crest, which are first to contact the threads of a standard, tapered male thread. Accordingly, as is apparent from FIG. 5, essentially the entire torque applied to the threads during tightening of the coupling is directed through the radially offset portions 52 of the female thread form in order to substantially deform the thread crests at the offset area, thus assuring that at least a substantial length of the spiral tunnel between the threads is completely filled to prevent leaks.

From the foregoing, it is apparent that the self-sealing, tapered thread form of the present invention not only provides for the reliable accomplishment of the objects of the invention, but does so in a particularly effective and reliable manner. It is recognized that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A threaded fastener device comprising:
   a female member including a body having a helical thread form thereon,
   said thread form having a generally tapered cross-sectional shape and being defined by a pair of converging flanks, a thread crest, and a thread root,
   a first portion of said thread root lying along a first reference axis inclined with respect to the longitudinal axis of said thread form,
   a second portion of said thread root being radially spaced from said first reference axis toward said longitudinal axis, said threaded fastener device further including a male member having a body provided with a helical thread form thereon, said thread form being defined by a pair of converging flanks, a thread crest and a thread root, the entire length of said last-named thread crest lying along a common reference axis.

2. The fastener device of claim 1, wherein said second portion of said thread root extends around at least about one revolution of said thread form.

3. The fastener device of claim 1, wherein said pair of converging flanks defining both said first and second portions of said thread root converge at substantially the same angle.

4. The fastener device of claim 1, wherein a first portion of said thread crest lies substantially along a second reference axis inclined with respect to said longitudinal axis and a second portion of said thread crest is radially spaced from said second reference axis inwardly toward said longitudinal axis.

5. The fastener device of claim 4, wherein said thread root of said second portion thereof and said thread crest of said second portion thereof respectively lie along third and fourth reference axes each substantially parallel to said longitudinal axis.

6. A threaded fastener device comprising:
a female member including a body having a helical thread form thereon,
said thread form having a generally tapered cross-sectional shape and being defined by a pair of converging flanks, a thread crest, and a thread root,
a first portion of said thread root lying along a first reference axis inclined with respect to the longitudinal axis of said thread form,
a second portion of said thread root being radially spaced from said first reference axis toward said longitudinal axis,
said first portion of said thread root including first and second sections of said thread form on opposite sides of said second portion of said thread root.

* * * * *